United States Patent
Seel et al.

(10) Patent No.: US 8,219,272 B2
(45) Date of Patent: *Jul. 10, 2012

(54) METHOD FOR MONITORING MULTI-MOTOR DRIVE

(75) Inventors: Andreas Seel, Hemmingen (DE); Holger Niemann, Ludwigsburg (DE); Oliver Kaefer, Murr (DE); Per Hagman, Alingsås (SE)

(73) Assignee: Robert Bosch GmbH, Stuttgart (DE)

( * ) Notice: Subject to any disclaimer, the term of this patent is extended or adjusted under 35 U.S.C. 154(b) by 853 days.

This patent is subject to a terminal disclaimer.

(21) Appl. No.: 12/159,472

(22) PCT Filed: Dec. 20, 2006

(86) PCT No.: PCT/EP2006/069960
§ 371 (c)(1),
(2), (4) Date: Dec. 31, 2008

(87) PCT Pub. No.: WO2007/074118
PCT Pub. Date: Jul. 5, 2007

(65) Prior Publication Data
US 2010/0042276 A1   Feb. 18, 2010

(30) Foreign Application Priority Data
Dec. 29, 2005   (DE) .......... 10 2005 062 870

(51) Int. Cl.
*B60L 9/00*   (2006.01)

(52) U.S. Cl. .......... 701/22; 60/698; 73/117.3; 74/336.5; 303/20; 318/109; 318/432; 320/118; 475/55; 477/3; 477/142; 701/1; 701/29; 701/208

(58) Field of Classification Search ............ 60/698; 73/117.3; 74/336.5; 303/20; 318/109, 432; 320/118; 475/55; 477/3, 142; 701/1, 22, 701/29, 208
See application file for complete search history.

(56) References Cited

U.S. PATENT DOCUMENTS

| | | | |
|---|---|---|---|
| 2,193,524 A * | 3/1940 | Thompson | 477/142 |
| RE21,844 E * | 6/1941 | Vetter | 74/336.5 |
| 2,623,409 A * | 12/1952 | Herndon et al. | 475/55 |
| 6,076,500 A | 6/2000 | Clement et al. | |
| 6,223,721 B1 | 5/2001 | Bauer et al. | |
| 6,393,356 B1 | 5/2002 | Clement et al. | |

(Continued)

FOREIGN PATENT DOCUMENTS

DE   19739564   3/1999

(Continued)

OTHER PUBLICATIONS

International Search Report, PCT International Patent Application No. PCT/EP2006/069960, dated Mar. 16, 2007.

*Primary Examiner* — James Trammell
*Assistant Examiner* — Sanjeev Malhotra
(74) *Attorney, Agent, or Firm* — Kenyon & Kenyon LLP

(57) ABSTRACT

A method for controlling a vehicle drive unit, which comprises at least two individual drives, at least one of which is able to provide a negative torque. A vehicle control unit is provided, within which a continuous torque comparison is performed within a monitoring level. A permissible torque is ascertained therein. Using a torque range checker it is established whether ascertained setpoint torques lie within torque ranges of the at least two individual drives.

10 Claims, 3 Drawing Sheets

U.S. PATENT DOCUMENTS

| | | | |
|---|---|---|---|
| 2002/0029624 A1* | 3/2002 | Gassner et al. | 73/117.3 |
| 2003/0144784 A1* | 7/2003 | Tashiro et al. | 701/54 |
| 2003/0189375 A1* | 10/2003 | Raad | 303/20 |
| 2003/0191583 A1* | 10/2003 | Uhlmann et al. | 701/208 |
| 2005/0010335 A1* | 1/2005 | Kettenacker et al. | 701/1 |
| 2005/0166594 A1* | 8/2005 | Jayabalan et al. | 60/698 |
| 2005/0272556 A1 | 12/2005 | Hiroe et al. | |
| 2006/0001392 A1* | 1/2006 | Ajima et al. | 318/432 |
| 2006/0076915 A1* | 4/2006 | Kaltenbach et al. | 318/432 |
| 2007/0164693 A1* | 7/2007 | King et al. | 318/109 |
| 2008/0211457 A1* | 9/2008 | Rudorff et al. | 320/118 |
| 2009/0171524 A1* | 7/2009 | Pitzal et al. | 701/29 |
| 2009/0204279 A1* | 8/2009 | Von Schwertfuehrer et al. | 701/22 |
| 2009/0305842 A1* | 12/2009 | Seel et al. | 477/3 |

FOREIGN PATENT DOCUMENTS

| | | |
|---|---|---|
| DE | 19739565 | 3/1999 |
| DE | 19932309 | 1/2001 |
| DE | 10225249 | * 12/2003 |
| DE | 10320017 | 12/2004 |
| WO | WO 2004/042884 | 5/2004 |

* cited by examiner

METHOD FOR MONITORING MULTI-MOTOR DRIVE

FIELD OF THE INVENTION

The present invention relates to a method for monitoring vehicles having multiple drives, at least one of the drives being able to generate a negative torque, thus, for example, a hybrid drive for hybrid vehicles.

BACKGROUND INFORMATION

A control unit for a drive unit is described in German Patent No. DE 103 20 017 A1, which in particular controls or regulates the drive unit in regard to an output drive torque, the drive unit being an internal combustion engine of a motor vehicle. The motor vehicle typically includes a driver input transmission device actuatable by the driver of the motor vehicle, in particular a gas pedal actuatable using the foot. This is provided to output an output signal representing an instantaneous actuation state of the driver input transmission device. A control unit receives the output signal from the driver input transmission device and assigns the received output signal at least one setpoint output variable, in particular a setpoint drive torque of the drive unit. The drive unit is activated by the control unit in such a way that an actual output variable output by the drive unit approximates the setpoint output variable. Control units of this type are available in various designs for typical motor vehicle engines, in particular gasoline engines and diesel engines, e.g., Bosch engine-control systems having an electronic gas pedal (EGAS).

Furthermore, it is conventional to perform continuous torque monitoring to discover malfunctions in the vehicle control unit. This is used in particular to protect passengers in the motor vehicle and external traffic participants. Unintended acceleration of the vehicle is to be avoided. The core of continuous torque monitoring is a comparison of an actual torque provided by the engine to a permissible torque. In the normal case, the actual torque is less than the permissible torque. If the actual torque exceeds the permissible torque, an error exists in the engine control unit, and an error response resulting in a safer vehicle state is initiated. Monitoring of engine control units and also vehicle control units is typically performed according to a three-level monitoring concept. The engine control itself, in particular presetting the setpoint torque, is performed in the first level, referred to as the functional level. The second level (monitoring level) is implemented as continuous torque monitoring. In this level, a permissible torque is ascertained as a function of vehicle and engine functions, inter alia, and compared to an actual engine torque. The second level is made secure in a complex manner, e.g., by double saving of all variables, cyclic RAM and cyclic ROM testing, and by permanent program sequence control. A further, third level is used for computer security.

German Patent Application No. DE 197 39 565 A1 relates to a method for controlling the torque of a drive unit of a motor vehicle, in which the torque of the drive unit is set at least according to the driver input, the actual torque of the drive unit being determined and a maximum permissible torque being ascertained at least on the basis of the driver input. A torque reduction and/or torque limiting occurs if the maximum permissible torque is exceeded by the actual torque. At least one operating state is established in which the torque of the drive unit is increased due to additional load. During this at least one operating state, the maximum permissible torque is increased. In particular, the permissible torque is thus increased during operation with a cold drive unit and/or during operation of high-load consumers.

The above-described conventional methods for torque monitoring generally may not be transferred to hybrid vehicles without further measures. In hybrid vehicles, at least one further torque source (motor) is used in addition to an internal combustion engine. In most cases, it is an electric drive.

In the engine controller, the desired torque requested by the driver, which is set by operating the gas pedal, is distributed to the existing torque sources (at least two motors). This is performed as a function of numerous surroundings variables, inter alia, with the goal of setting the operating point which is most favorable for consumption for all torque sources, i.e., for all motors. Previously, however, no torque monitoring has been provided which deals with the special requirements of such a hybrid drive having one or more electric motors in addition to an internal combustion engine in the drivetrain of a vehicle. An additional electric motor connected to the drivetrain may cause an undesired vehicle acceleration at excessively high activation currents just like a "nonstop" internal combustion engine and thus also requires continuous torque monitoring.

In previous monitoring methods, monitoring has only been performed for excessively high torque. For motors which cannot generate a negative torque, this is sufficient, because in this way undesired acceleration of the vehicle may be reliably avoided. However, a new error source arises in systems having multiple motors, at least one of which may generate a negative torque. In these systems, thus, for example, hybrid drives, the vehicle may accelerate unintentionally although the total setpoint torque is not greater than the permissible torque. This may occur if a drive motor receives a setpoint value for a torque outside its settable range. Thus, for example, the vehicle battery may be charged during travel in hybrid vehicles. The at least one electric drive is to provide a negative torque of −100 Nm, for example, to charge the battery, so that the electric drive is operated in the generator mode in this case. To obtain a desired drive torque of 200 Nm, for example, the vehicle control unit increases the torque of the internal combustion engine by this amount, 300 Nm in the selected example. If the at least one electric drive is unable to provide the requested negative torque and may only output a negative torque of −10 Nm, for example, because of a temperature increase or overheating, an excessively high drive torque exists, 290 Nm in the present example, which significantly exceeds the desired drive torque of 200 Nm, for example. In previous designs of vehicle control units, this error would not be noted, because the total setpoint torque is correct and no feedback exists in a monitoring level of the vehicle control unit as to whether the requested torque, i.e., the desired drive torque, is settable. In previously selected approaches regarding this problem, a comparison is performed between the permissible torque and an actual torque output by the individual drives of the hybrid drive. However, this requires very great complexity, because the functional level of the actuators has had to be mapped in the monitoring unit of the vehicle controller.

SUMMARY

A method according to an example embodiment of the present invention establishes whether or not an excessively high drive torque exists because of a non-settable torque of one of the individual drives of a hybrid drive, for example. The controllability of a vehicle equipped with a hybrid drive is thus significantly increased and the hazard to individuals, whether vehicle occupants or other traffic participants, is significantly reduced. In one example embodiment according to the present invention, a torque range check is incorporated in one level of the vehicle control unit, preferably in the monitoring level, which is also referred to as the second level. The individual drives of a hybrid drive transmit the particular prevailing operating limits of the individual drives to the vehicle controller for this purpose, for example. The vehicle control unit accepts the prevailing operating limits of the individual drives in the monitoring level (second level). In addition to the torque comparison performed previously in regard to the agreement of setpoint torque and actual torque or the correction of the actual torque to the desired setpoint torque, it is checked whether the ascertained setpoint torques lie within the settable range of the particular individual drive. The particular possible torque range which may be delivered by the particular individual drives is thus incorporated in the calculation. Furthermore, it is thus ensured that the vehicle controller only requests those setpoint torques which may actually be delivered by the individual drives of a hybrid drive. An excessively high drive torque may thus be prevented from being requested because of the non-fulfillment of a torque demand in a vehicle which is driven using a hybrid drive. The safety of such a vehicle and its controllability are thus improved. The check may advantageously be performed very simply, because it must only be checked whether the calculated setpoint torque lies within fed back torque range limits. Furthermore, the suggested approach according to the present invention avoids the functional level (first level of the vehicle control unit) from being represented in the monitoring level (second level) in regard to intrinsic functionalities and dynamic behavior of the individual drives, which finally significantly reduces the development and calibration complexity.

BRIEF DESCRIPTION OF THE DRAWINGS

The present invention is described in greater detail below based on the figures.

DETAILED DESCRIPTION OF EXAMPLE EMBODIMENTS

Figure 1:
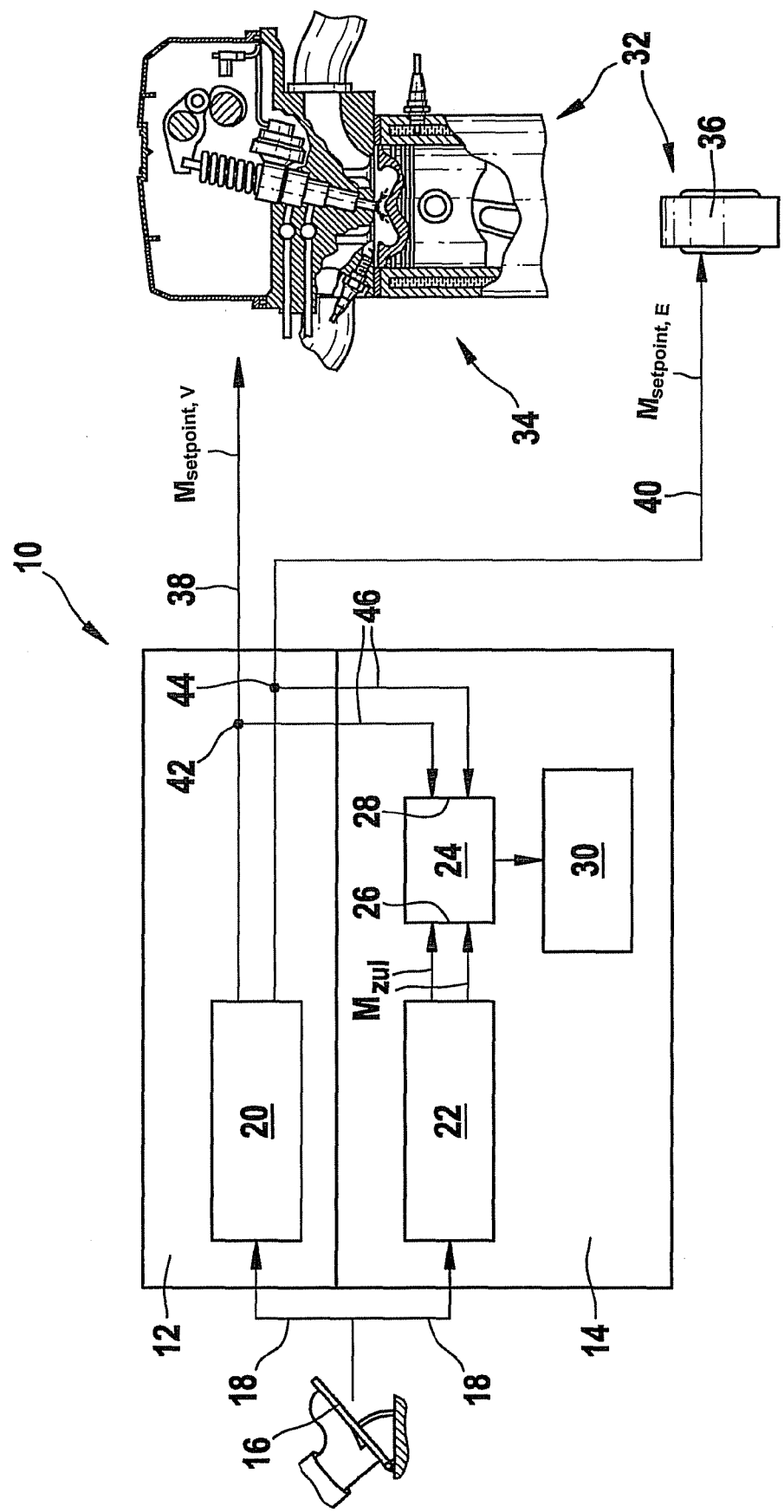
FIG. 1 shows continuous torque monitoring within a vehicle control unit between a permissible torque $M_{zul}$ and a setpoint torque $M_{setpoint}$, which is delivered by the setpoint torque components of two drives.

FIG. 1 shows continuous torque monitoring within a vehicle control unit, continuous torque monitoring being performed in a comparison stage between a permissible torque $M_{zul}$ and setpoint torques $M_{setpoint,V}$ and $M_{setpoint,E}$.

A vehicle control unit 10 shown in FIG. 1 includes a functional level 12 (first level) and a monitoring level 14 (second level). Both levels 12, 14 are integrated into the vehicle control unit 10. Depending on the position of a gas pedal 16 determined by the driver, which is used as the driver input transmission device, a setpoint value 18 of a setpoint torque is impressed on a calculation stage 20 provided in functional level 12 and also on a calculation stage 22 in monitoring level 14. In functional level 12, calculation stage 20 calculates both a setpoint torque $M_{setpoint,V}$ 38 and a value for a setpoint torque $M_{setpoint,E}$ 40. Setpoint torques $M_{setpoint,V}$ 38 and $M_{setpoint,E}$ 40 are output to a hybrid drive 32, which includes at least one internal combustion engine 34 and also at least one electric drive 36. Setpoint torque $M_{setpoint,V}$ 38 ascertained in calculation stage 20 is transmitted to internal combustion engine 34 of hybrid drive 32, while setpoint torque $M_{setpoint,E}$ 40 ascertained in calculation stage 20 is transmitted to the at least one electric drive 36.

A permissible torque $M_{zul}$ is ascertained in monitoring level 14 (second level) of vehicle control unit 10 on the basis of setpoint value 18 in calculation stage 22. This permissible torque is transmitted to a comparison stage 24. Furthermore, the values ascertained in calculation stage 20 in functional level 12 for setpoint torques $M_{setpoint,V}$ 38 and $M_{setpoint,E}$ 40 for individual drives 34, 36 of hybrid drive 32 are transmitted to comparison stage 24 via a tap pathway 46 at taps 42 and 44. An error response 30 follows as a function of the result of comparison 24. Comparison stage 24 includes at least one input 26 for permissible torque $M_{zul}$ and inputs 28 for at least setpoint torques $M_{setpoint,V}$ 38 and $M_{setpoint,E}$ 40.

Figure 2:
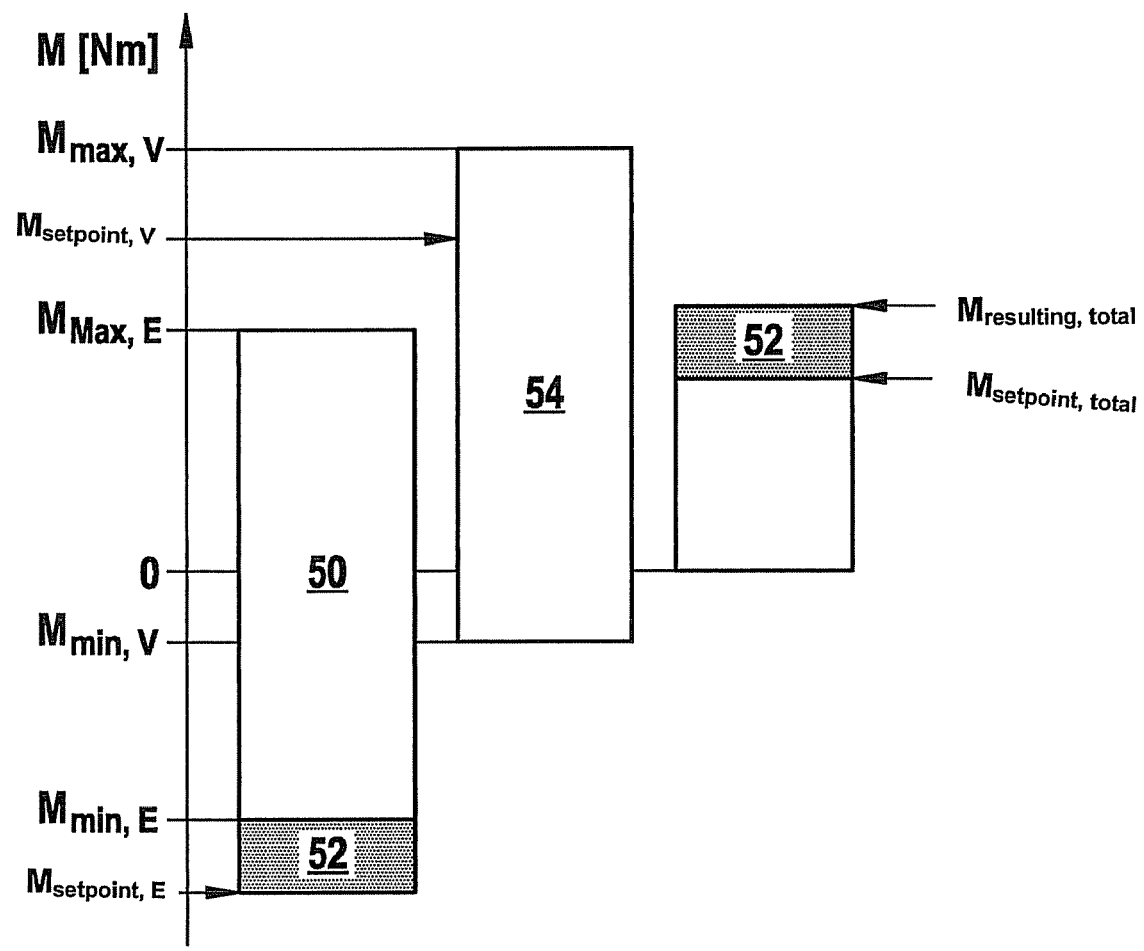
FIG. 2 shows a comparison of the individual torque components of the individual drives and a torque $M_{res}$ resulting therefrom and an error as a function of an individual drive.

The illustration in FIG. 2 shows the occurrence of a torque error without checking the range in which the particular individual drives of a combination drive may provide torques in consideration of prevailing operating conditions. This is described hereafter using the example of a parallel hybrid drive.

Using a combination drive, such as a hybrid drive 32 having at least one internal combustion engine 34 and at least one electric drive 36, for example, a vehicle battery may be charged during travel. For this purpose—as an example—the at least one electric drive 36 is to provide a negative torque, such as −100 Nm, for example, to charge the vehicle battery. The at least one electric drive 36 is operated in generator mode for this purpose. To obtain the desired drive torque of 200 Nm, for example, vehicle control unit 10 will increase the torque of the at least one internal combustion engine 34 by the amount of 300 Nm. If the at least one electric drive 36 is unable to provide the required negative torque because of overheating, for example, or is for other reasons only able to provide a negative torque of −10 Nm, for example, then an excessively high drive torque exists, in the present case 290 Nm, which exceeds the desired drive torque, in the present example of 200 Nm, by 90 Nm, for example. A torque range shown in FIG. 2, within which the at least one electric drive 36 may be operated, is identified by reference numeral 50. The at least one electric drive 36 is capable of providing a maximum torque $M_{max,E}$ and a minimum torque $M_{min,E}$, of identical absolute value. An error is indicated by reference numeral 52, which results if a setpoint torque $M_{setpoint,E}$ is desired which lies outside the torque range of the at least one electric drive 36.

Reference numeral 54 identifies a torque range within which the at least one internal combustion engine 34 of hybrid drive 32 may be operated. Torque range 54 for internal combustion engine 34 is delimited by a maximum torque $M_{max,V}$ and a minimum torque $M_{min,V}$, within which the at least one internal combustion engine 34 may be operated. In the case of torque range 54, the absolute value of maximum torque $M_{max,V}$ is greater than the absolute value of minimum torque $M_{min,V}$.

In regard to resulting torque $M_{res,ges}$ which is thus established, a value results which exceeds total setpoint $M_{setpoint,ges}$ by error torque 52. In this case, resulting total torque $M_{res,ges}$ which is thus established is greater than desired setpoint torque $M_{setpoint,ges}$, which is composed of setpoint torque $M_{setpoint,E}$ 40 for the at least one electric drive 36 and setpoint torque $M_{setpoint,V}$ 38 for the at least one internal combustion engine 34.

In this case, an impermissibly strong acceleration of a vehicle using a combination drive such as a hybrid drive 32, for example, would occur.

This is caused because monitoring level 14 of vehicle control unit 10 shown in FIG. 1 does not notice this type of error, since the total setpoint torque is correct and no feedback is present in functional level 14 of vehicle control unit 10 in regard to whether the requested torque of the particular individual drive, in the present case of FIG. 2 of the at least one electric drive 36, lies within torque range 50 within which the requested torque, in this case $M_{setpoint,E}$, is settable. A solution to this problem may be to perform a comparison between permissible torque $M_{zul}$ and the actual torque output by hybrid drive 32, i.e., calculated from the sum of [the actual torques output] by individual drives 34, 36. However, this requires a very great complexity, because functional level 12 (first level) of vehicle control unit 10 would have to be represented in monitoring level 14 (second level) of vehicle control unit 10, which would cause very high calibration and development complexity for continuous torque monitoring.

Figure 3:
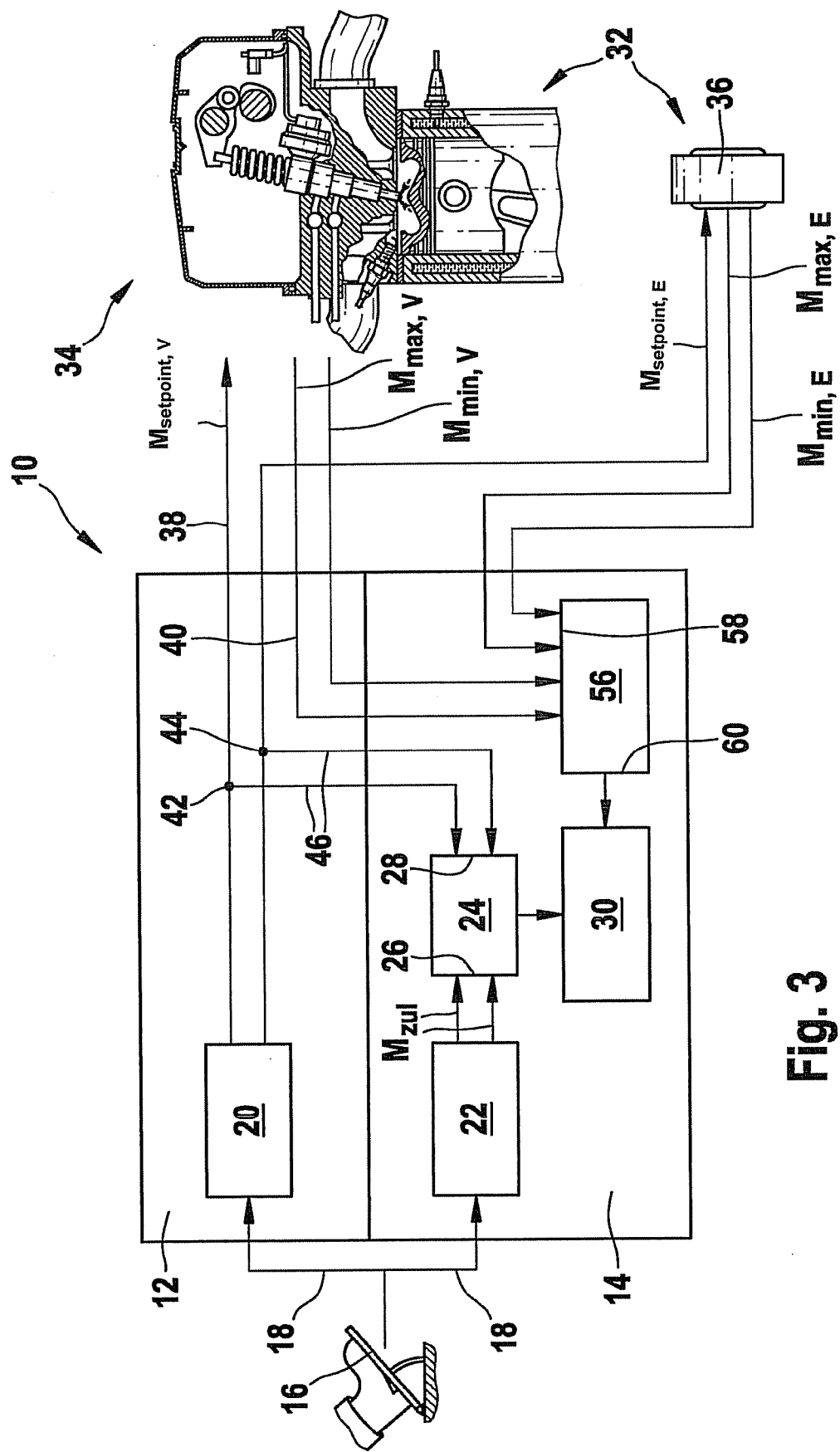
FIG. 3 shows the implementation of a range limit check of the individual drives within a vehicle control unit.

As shown in FIG. 3, it is suggested according to the present invention that torque range checker 56 be implemented in monitoring level 14 (second level) of vehicle control unit 10. It is established within torque range checker 56 whether an excessively high drive torque exists because of a non-settable torque. A non-settable torque is understood as a torque which lies outside torque range 50 of the at least one electric drive 36 delimited by particular torque upper limits $M_{max,E}$ and $M_{min,E}$ and/or a torque which lies outside torque range 54 for the at least one internal combustion engine 34 delimited by upper limit $M_{max,V}$ and lower limit $M_{min,V}$. The at least one internal combustion engine 34 and the at least one electric drive 36 feed the prevailing operating limits back to vehicle control unit 10 for this purpose, in particular in monitoring level 14 (second-level) of vehicle control unit 10. Particular parameters $M_{max,V}$, $M_{min,V}$, $M_{max,E}$, and $M_{min,E}$ fed back by the at least one internal combustion engine 34 and the at least one electric drive 36 are available there at inputs 58 of a torque range checker 56 as input variables. In addition to the torque comparison performed previously in regard to the setpoint torques of individual drives 34, 36 with permissible torques $M_{zul}$, it is also checked within torque range checker 56 in monitoring level 14 (second level) whether ascertained setpoint torques $M_{setpoint,V}$ 38 and $M_{setpoint,E}$ 40 lie within torque ranges 50 and 54 for the at least one internal combustion engine 34 and the at least one electric drive 36. It is thus ensured that vehicle control unit 10 requests only those setpoint torques which may actually be implemented by the at least one internal combustion engine 34 and/or the at least one electric drive 36 of hybrid drive 32 under consideration of their prevailing operating parameters. In this way, an excessively high resulting torque $M_{res,ges}$, as shown in FIG. 2, would be effectively suppressed because of the non-fulfillment of a torque request by the at least one internal combustion engine 34 and the at least one electric drive 36. The controllability of the vehicle is thus significantly improved. A further advantage of the example method according to the present invention may be seen in that in an extremely simple implementation of this torque range checker 56, it must only be checked whether the setpoint torque calculated in functional level 12 (first level), i.e., the request for setpoint torque $M_{setpoint,V}$ 38 for the at least one internal combustion engine 34 and the request for setpoint torque $M_{setpoint,E}$ 40 for the at least one electric drive 36 lie within torque ranges 50 and 54 fed back by the at least one internal combustion engine 34 and the at least one electric drive 36. Simulation of functional level 12 (first level) in monitoring level 14 (second-level) of vehicle control unit 10 is thus dispensed with according to FIG. 3. The setpoint torque values are secured by a comparison stage 24 and a range limit check. This makes a simulation of the intrinsic functionalities of individual drives 34, 36 in first monitoring level 14 superfluous, because no resulting actual torque comparison is required to ensure the security. The total actual torque of the combination drive is not to be checked.

Setpoint torques $M_{setpoint,V}$ 38 and $M_{setpoint,E}$ 40 calculated in calculation stage 20 for predefinition are tapped at taps 42 and 44, which lie in functional level 12 (first level) of vehicle control unit 10, and are transmitted to at least one input 28 of comparison stage 24 provided in monitoring level 14 (second level). Calculated predefined setpoint torques $M_{setpoint,V}$ 38 and $M_{setpoint,E}$ 40 are compared there to permissible torques $M_{zul}$ calculated in monitoring level 14. An error response 30 occurs as a function of the result of the torque comparison in comparison stage 24. Torque range checker 56 implemented in monitoring level 14 (second level) generates a signal triggering an error response 30 at output 60 for the case in which the values for setpoint torques $M_{setpoint,V}$ 38 and $M_{setpoint,E}$ 40 lie outside the particular upper and lower limits $M_{max,V}$, $M_{max,E}$ and $M_{min,V}$, $M_{min,E}$. In this case, the requested torque according to values 38 and 40 may not be provided by at least one of the individual drives of hybrid drive 32, which is established within the scope of torque range checker 56 and results in the output of a corresponding error signal to error response 30. Through torque range checker 56 integrated into monitoring level 14 (second-level), in the event of changes in the drivetrain of a vehicle having hybrid drive 32, a complete re-adaptation in functional level 12 of vehicle control unit 10 does not have to be performed when a component such as an electric drive 36, for example, is replaced.

What is claimed is:

1. A method for controlling a vehicle drive unit which includes at least two individual drives, at least one of which may provide a negative torque, and a vehicle control unit, the method comprising:
   performing a continuous torque comparison within a monitoring level, in which permissible setpoint torques $M_{setpoint,V}$ and $M_{setpoint,E}$ are ascertained; and
   checking using a torque range checker whether the ascertained setpoint torques $M_{setpoint,V}$ and $M_{setpoint,E}$ lie within torque ranges of the at least two individual drives.

2. The method as recited in claim 1, wherein the vehicle drive unit includes at least one internal combustion engine and at least one electric drive; and wherein a torque range of the at least one internal combustion engine is delimited by torque range limits $M_{max,V}$ and $M_{min,V}$ and the torque range of the at least one electric drive is delimited by torque range limits $M_{max,E}$ and $M_{min,E}$.

3. The method as recited in claim 2, wherein the torque range limits $M_{max,V}$, $M_{min,V}$, $M_{max,E}$, and $M_{min,E}$ are fed back continuously to the monitoring level.

4. The method as recited in claim 1, wherein the ascertained setpoint torques $M_{setpoint,V}$ and $M_{setpoint,E}$ are ascertained in a functional level of the vehicle control unit and are transmitted to a continuous torque comparison unit in the monitoring level within the vehicle control unit.

5. The method as recited in claim 2, wherein the torque range checker triggers an error response in an event of the setpoint torques $M_{setpoint,V}$ and $M_{setpoint,E}$ outside the torque range limits $M_{max,V}$, $M_{min,V}$, $M_{max,E}$ and $M_{min,E}$.

6. The method as recited in claim 2, wherein the torque range limits $M_{max,V}, M_{min,V}, M_{max,E}$ and $M_{min,E}$ are continuously updated in control units of the at least one internal combustion engine and the at least one electric drive.

7. The method as recited in claim 2, wherein the setpoint torques $M_{setpoint,V}$ and $M_{setpoint,E}$ are checked as torques lying within the torque ranges before calculation of a total setpoint torque.

8. The method as recited in claim 2, wherein the continuous torque comparison between the permissible torque and the setpoint torques $M_{setpoint,V}$ and $M_{setpoint,E}$ is performed in parallel to the torque range check between the setpoint torques $M_{setpoint,V}$, $M_{setpoint,E}$ and the torque range limits $M_{max,V}$, $M_{min,V}$, $M_{max,E}$ and $M_{min,E}$.

9. A vehicle control unit for a combination drive, comprising:
   at least one internal combustion engine and at least one electric drive, the vehicle control unit having a functional level and a monitoring level for the at least one internal combustion engine;
   at least one electric drive; and
   a torque range checker implemented in the monitoring level, in which a first setpoint torque $M_{setpoint,V}$ and a second setpoint torque $M_{setpoint,E}$ are compared to updated torque range limits $M_{max,V}, M_{min,V}, M_{max,E}, M_{min,E}$ before calculation of a total setpoint torque.

10. The vehicle control unit as recited in claim 9, wherein both a continuous torque comparison and a continuous torque range check are implemented in the monitoring level.

* * * * *